UNITED STATES PATENT OFFICE.

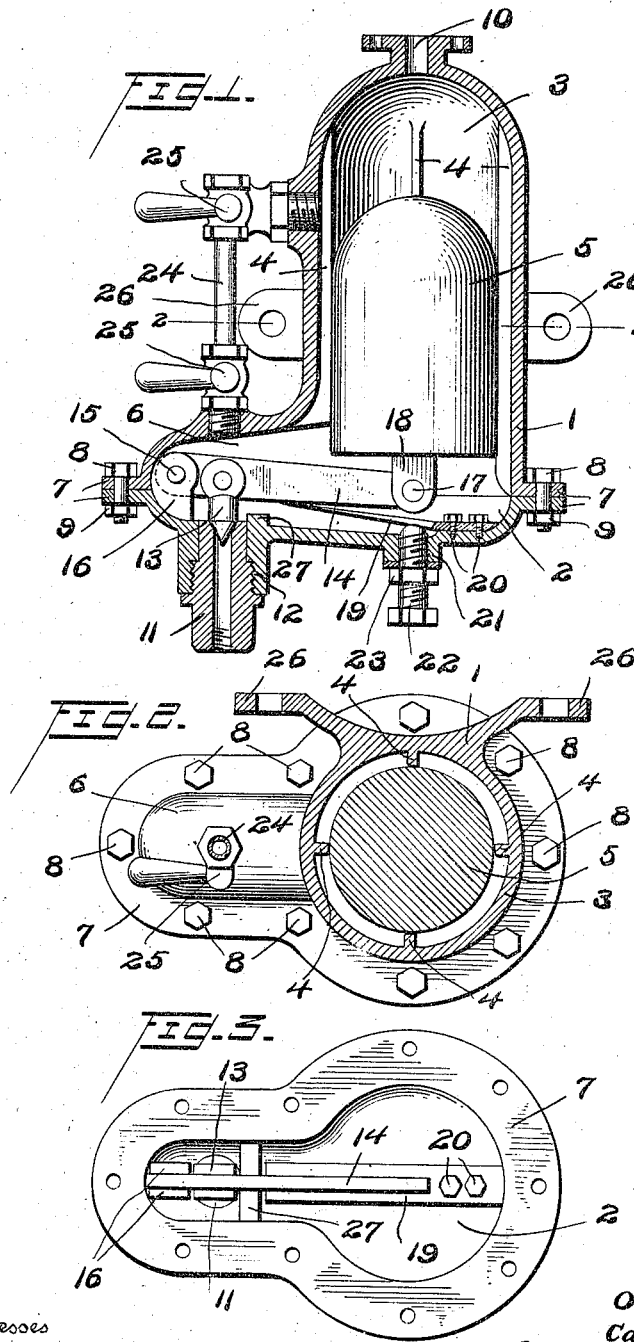

ORESTE PAPPANO AND CARL G. ALLGRUNN, OF BETHLEHEM, PENNSYLVANIA.

STEAM-TRAP.

1,122,994.

Specification of Letters Patent.

Patented Dec. 29, 1914.

Application filed October 27, 1913. Serial No. 797,501.

*To all whom it may concern:*

Be it known that we, ORESTE PAPPANO and CARL G. ALLGRUNN, citizens of the United States, residing at Bethlehem, in the county of Northampton and State of Pennsylvania, have invented certain new and useful Improvements in Steam-Traps, of which the following is a specification.

Our invention relates to improvements in steam traps, an object of the invention being to provide a steam trap in which a solid float is utilized, and which will operate with equal efficiency under any pressure of steam.

A further object is to provide a steam trap with a solid valve having adjustable spring supporting means therefor, whereby the float may be balanced to a nicety to render it buoyant to insure the proper opening of the valve when water accumulates in the trap.

With these and other objects in view, the invention consists in certain novel features of construction and combinations and arrangements of parts as will be more fully hereinafter described and pointed out in the claims.

In the accompanying drawings, Figure 1 is a view in vertical section illustrating our improvements. Fig. 2 is a view in horizontal section on the line 2—2 of Fig. 1, and Fig. 3 is a view of the casing bottom detached illustrating the several parts supported in the bottom.

1 represents the casing of our improved trap which has a removable bottom 2. The main portion of the casing is of general cylindrical form as shown at 3 having internal longitudinal webs 4 to guide a cylindrical float 5 therein, while the lower portion of said casing is formed with a lateral extension 6, and the casing 1 and bottom 2 are provided with integral perforated flanges 7 for the reception of bolts 8, which are clamped by nuts 9, so as to hold the two parts of the casing tightly together.

An inlet 10 is provided in the top of casing 1 and a removable hollow plug 11 is screwed into a threaded nipple 12 on the bottom 2, and communicates with the lateral extension 6 constituting an outlet for water and providing a removable valve seat for a valve 13. This valve 13 is connected to a lever 14 which is pivotally connected at one end as shown at 15 to a bifurcated bracket 16 on bottom 2, and projecting up into the extension 6. The free end of this lever 14 is pivotally connected by a pin 17 with a lug 18 integral with the bottom of float 5, so that the movement of the float controls the operation of the valve 13.

To the bottom 2, a spring 19 is secured by screws 20 or other fastening means located at one end of the spring, while the free end of the spring bears against the under face of lever 14, balancing the weight of float 5 to allow the same to be elevated by water accumulating in the casing. The bottom 2, below spring 19, is provided with a screw-threaded opening 21 in which a screw 22 is located and bears at its upper end against the spring 19 to regulate the tension of the spring. A jam nut 23 holds the screw 22 against movement after adjustment, and the opening 21 in which the screw is located is at the lowest point of the bottom 2, so that when the screw is removed, the casing can be effectually drained. A gage 24 connects the extension 6 with the casing 1, and is provided with the ordinary cocks 25 which may be closed and opened whenever desired. This gage 24, if full of water, will indicate that the valve is not operating properly and indicates at a glance the condition of the trap. Integral perforated ears 26 are formed on the casing, so that the trap may be readily secured to any support. The bottom 2 is provided with a transverse upwardly projecting flange or ledge 27 which prevents sediment collecting at the valve and seat to interfere with the proper operation of the valve.

It will be noted that our improved float 5 is solid, hence need be but relatively small and capable of withstanding any pressure without collapsing. The spring 19, so balances the weight of the solid float that the latter may be made of metal or any suitable material and will readily respond to the buoyancy of the water accumulating in the casing, so that the valve 13 will be opened and the water permitted to escape.

Various slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. A steam trap, comprising a cylindrical casing having at its lower end a laterally projecting hollow extension communicating with the casing and off-set to one side thereof, a removable bottom closing the casing and the extension, a lever pivotally connected at one end to the removable bottom independent of the extension, a float connected to the free end of the lever and movable in the casing, a valve connected to the lever adjacent its pivot and controlling an outlet from the casing, a spring secured at one end to the bottom of the casing, and at its free end engaging an intermediate portion of the lever, and an adjusting screw in the bottom of the casing engaging the spring, substantially as described.

2. A steam trap, comprising a cylindrical casing having at its lower end a laterally projecting hollow extension communicating with the casing and off-set to one end thereof, a removable bottom closing the casing and the extension, a lever pivotally connected at one end to the removable bottom independent of the extension, a float connected to the free end of the lever and movable in the casing, a valve connected to the lever adjacent its pivot and controlling an outlet from the casing, a spring secured at one end to the bottom of the casing, and at its free end engaging an intermediate portion of the lever, and a gage connecting the top of the extension with the side of the casing, substantially as described.

In testimony whereof we have signed our names to this specification in the presence of two subscribing witnesses.

ORESTE PAPPANO.
CARL G. ALLGRUNN.

Witnesses:
FRANK PINUCCI,
JOSEPH R. SCATTINE.